United States Patent
Ruffini et al.

(10) Patent No.: US 9,398,316 B2
(45) Date of Patent: *Jul. 19, 2016

(54) TEMPORARY STORAGE OF RECORDED CONTENT ON A CLOUD STORAGE SERVER

(71) Applicants: Verizon Patent and Licensing Inc., Arlington, VA (US); Verizon and Redbox Digital Entertainment Services, LLC, Basking Ridge, NJ (US)

(72) Inventors: Michael P. Ruffini, Methuen, MA (US); Jianxiu Hao, Acton, MA (US); Sankar Subramanian, Ossining, NY (US); Joseph E. Scott, Flower Mound, TX (US)

(73) Assignees: Verizon Patent and Licensing Inc., Basking Ridge, NJ (US); Verizon and Redbox Digital Entertainment Services, LLC, Basking Ridge, NJ (US)

( * ) Notice: Subject to any disclaimer, the term of this patent is extended or adjusted under 35 U.S.C. 154(b) by 73 days.

This patent is subject to a terminal disclaimer.

(21) Appl. No.: 14/182,207

(22) Filed: Feb. 17, 2014

(65) Prior Publication Data
US 2015/0237384 A1    Aug. 20, 2015

(51) Int. Cl.
*H04N 7/173* (2011.01)
*H04N 21/231* (2011.01)
*H04N 21/258* (2011.01)
*H04N 21/442* (2011.01)
*H04N 21/2187* (2011.01)
(Continued)

(52) U.S. Cl.
CPC ..... *H04N 21/23106* (2013.01); *H04N 7/17318* (2013.01); *H04N 21/2187* (2013.01); *H04N 21/222* (2013.01); *H04N 21/23113* (2013.01); *H04N 21/25891* (2013.01); *H04N 21/2747* (2013.01); *H04N 21/4334* (2013.01); *H04N 21/44204* (2013.01); *H04N 21/44222* (2013.01); *H04N 21/4668* (2013.01); *H04N 21/6582* (2013.01)

(58) Field of Classification Search
CPC ............. H04N 21/23106; H04N 21/2747; H04N 21/44222; H04N 21/4668; H04N 21/222; H04N 21/44204; H04N 21/2187; H04N 21/23113; H04N 7/17318; H04N 21/25891; H04N 21/4334; G06F 17/30206; G06F 17/30117
USPC ............... 725/92, 93, 96, 115, 116, 133, 141, 725/145, 146, 153; 707/827
See application file for complete search history.

(56) References Cited

U.S. PATENT DOCUMENTS 7,712,113 B2 *   5/2010   Yoon et al. ................. 725/9
2002/0057297 A1 *   5/2002   Grimes et al. ............. 345/810
(Continued)

*Primary Examiner* — Hoang-Vu A Nguyen-Ba

(57) ABSTRACT

A server device may receive, from a user device, a request to store a unique copy of particular content, associated with a particular user; store, in a storage device associated with the server device, the unique copy of the particular content; determine a set of attributes of the particular content; determine a set of criteria based on which the unique copy of the particular content should be provided to the user device, the determining being based on one or more attributes, of the set of attributes of the particular content; determine that the set of criteria have been met; output, based on determining that the set of criteria have been met, the unique copy of the particular content to the user device; and delete the unique copy of the particular content from the storage device after outputting the particular content to the user device.

20 Claims, 8 Drawing Sheets

(51) Int. Cl.
*H04N 21/222* (2011.01)
*H04N 21/433* (2011.01)
*H04N 21/2747* (2011.01)
*H04N 21/466* (2011.01)
*H04N 21/658* (2011.01)
*H04N 7/16* (2011.01)
*G06F 17/30* (2006.01)

(56) References Cited

U.S. PATENT DOCUMENTS

2009/0228492 A1* 9/2009 Valdez et al. .................. 707/10
2012/0206647 A1* 8/2012 Allsbrook et al. ............ 348/461
2014/0180701 A1* 6/2014 Grilli et al. ........................ 705/2

* cited by examiner

400 →

| Content Offload Parameters ||
|---|---|
| Content Attribute | Offload Criteria |
| Content Name = Show 1 | 1 week after recording<br>Off-peak time of day |
| Content Type = Movie | Weekend after recording<br>Off-peak time of day |
| Content Type = Live Sports | First playback or 1 week after recording |
| Content Name = Any<br>Content Type = Television Show<br>Content Genre = Drama<br>Content popularity > 8/10 | First Off-peak time after content recorded |

Fig. 4

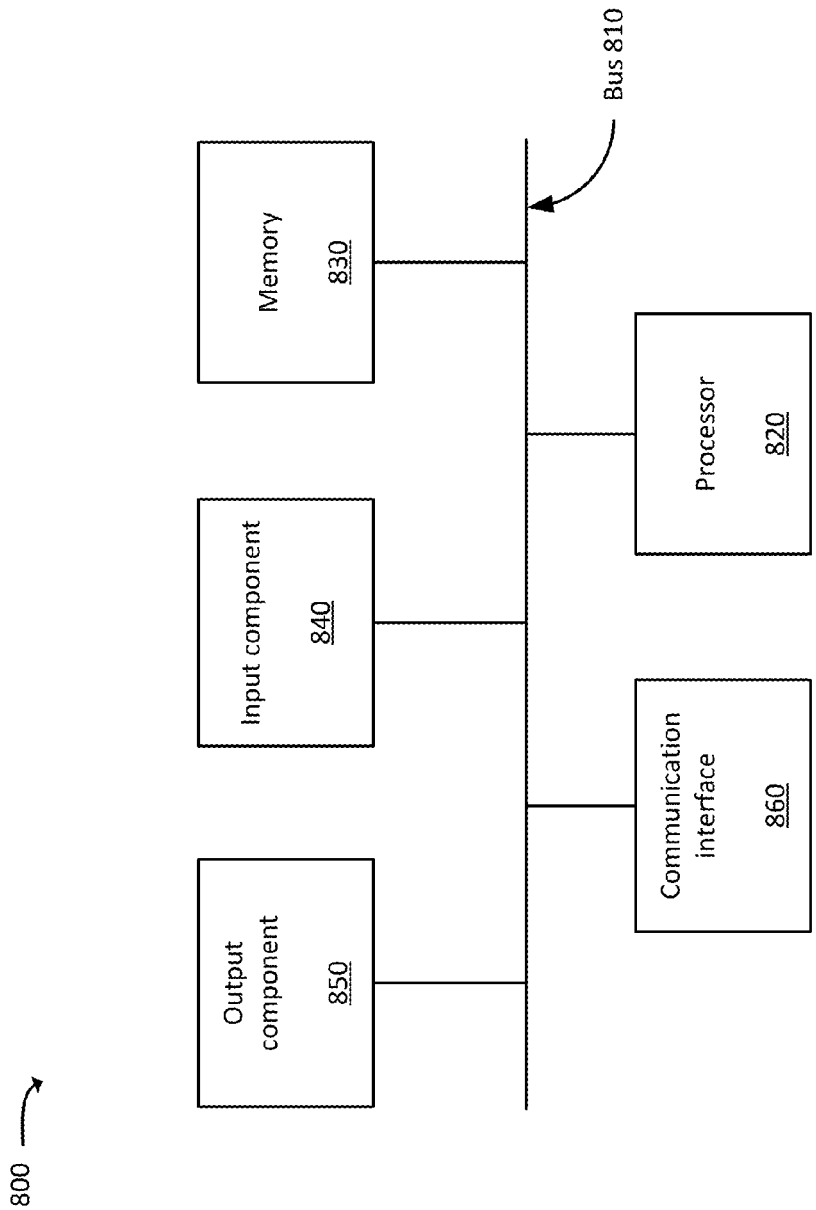

TEMPORARY STORAGE OF RECORDED CONTENT ON A CLOUD STORAGE SERVER

BACKGROUND

Digital content may be provided to users via user devices (e.g., set-top boxes, smart phones, tablets, portable and desktop computers, etc.). Users may record digital content, such as live broadcasted content associated with broadcast channels, such that the digital content may be accessed at a later time or viewed repeatedly. Recorded content can be stored on a user device, such as a set-top box. Alternatively, recorded content can be stored remotely on a cloud storage server. While storage space on a user device may be limited, storing content remotely on the cloud storage server may be expensive. Further, accessing content from the cloud storage server may consume greater network resources than when content is accessed directly from a local storage of the user device.

BRIEF DESCRIPTION OF THE DRAWINGS

FIG. 4 illustrates an example data structure that may store content offload parameters;

FIG. 8 illustrates example components of a device, according to one or more implementations described herein.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may temporarily store a unique copy of content (e.g., recordings of live broadcast content) on a cloud storage server for a user. The unique copy may be associated with the particular user and may include digital rights management (DRM) information that authorizes the user to access the unique copy.

The cloud storage server may identify that the unique copy of the content should be provided for storage on a user device (e.g., based on one or more attributes of the content) and subsequently removed from the cloud storage server after the content has been provided to the user device. The cloud storage server may identify criteria under which the content should be provided to the user device (e.g., when the user is likely to access the content, when storage is available on the user device, when the user's usage of storage allocation on the cloud storage server is exceeded, at an off-peak time, etc.). As a result, the cloud storage server may be used to facilitate and manage the storage of content for a user, while also offloading the content from the cloud storage server, thereby reducing storage space consumed on the cloud storage server and reducing network load associated with accessing the content from the cloud storage server. Further, a unique copy of content can be stored by the cloud storage server, such that DRM information, included in the unique copy, can be used authorize the user to access the content.

Figure 1:
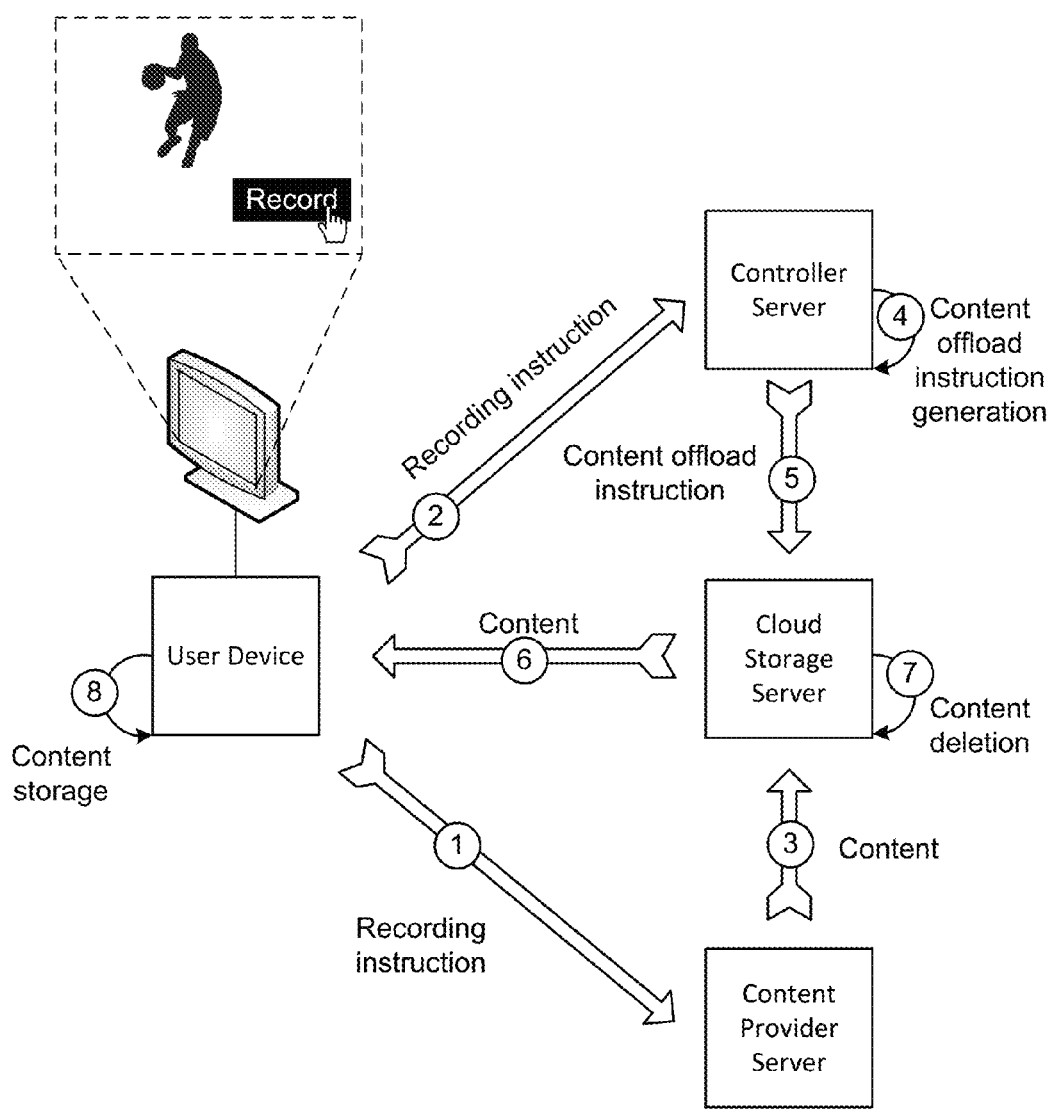
FIG. 1 illustrates an example overview of an implementation described herein.

FIG. 1 illustrates an example overview of an implementation described herein. As shown in FIG. 1, a user device may receive a selection from a user to record content currently received by the user device (e.g., live broadcast content or some other content) and presented on an associated display. Based on receiving the selection, the user device may provide a recording instruction to a content provider server (arrow 1). The user device may also provide the recording instruction to a controller server (arrow 2). The recording instruction may identity the content that the user has selected to record. Based on receiving the recording instruction, the content provider server may provide the content to the cloud storage server (arrow 3). For example, the recording instruction may direct the content provider server to provide, to the cloud storage server, a unique copy of live broadcasted content and/or unique copy of some other content that the user has selected to record, so that a user of the user device may access the content at a later time.

Based on receiving the recording instruction, the controller server may identify one or more attributes of the content identified in the recording instruction (e.g., the name of the content, the type of the content, a genre of the content, a popularity of the content, and/or user viewing habits associated with the content, such as how frequently the user views the content once recorded). The controller server may then identify that the unique copy of the content should be provided from the cloud storage server to the user device for storage, and subsequently removed from the cloud storage server. For example, the controller server may identify that the unique copy of the content should be provided based on the one or more attributes of the content. Based on identifying that the unique copy of the content should be provided to the user device, the controller server may generate a content offload instruction (arrow 4).

In some implementations, the content offload instruction may identify when the unique copy of the content should be provided to the user device. As an example, the content offload instruction may identify that a unique copy of the content having a particular attribute (e.g., a particular content name, a particular measure of popularity, a particular genre or type, and/or some other attribute) should be provided to the user device when particular criteria are met (e.g., within one week of the content having been recorded by the user, when the content is first accessed by the user, at an off-peak time, and/or when some other criterion is met). In some implementations, the criteria may correspond to when the user is likely to access the content, based on the user's viewing history. Thus, the content offload instruction may identify that content, having particular attributes, should be provided to the user device when the user is likely to view the content, or at some other time.

In some implementations, the controller server may generate different content offload instructions for content having different attributes. For example, for first content having a first set of attributes, the controller server may generate a first content offload instruction to direct the cloud storage server to provide the first content immediately after the first content has been recorded and by the cloud storage server (e.g., when the user is likely to access the first content immediately after recording the first content, based on the user's viewing history of content having the first set of attributes). For second content having a second set of attributes, the controller server may generate a second content offload instruction to direct the cloud storage server to provide the second content a week after the second content has been recorded and stored by the cloud storage server (e.g., when the user is likely to access the second content a week later, based on the user's viewing habits of content having the second set of attributes).

As further shown in FIG. 1, the controller server may provide the content offload instruction to the cloud storage server (arrow 5). Based on receiving the content offload instruction, the cloud storage server may provide the content (arrow 6) to the user device when the criteria, identified in the content offload instruction, have been met. Based on providing the content to the user device, the cloud storage server may delete the content (arrow 7), and the user device may store the content (arrow 8). As a result, the cloud storage server may temporarily store the content on behalf of the user device until the criteria in the content offload instruction have been met, such as until storage is available on the user device, the user's usage of allocated storage space on the cloud storage server has been exceeded, the user is likely to access the content (e.g., as determined based on the user's viewing history, viewing preferences, content popularity, etc.), or until some other criteria have been met. Further, the cloud storage server may function as an application server to provide the user with a technique to manage the user's recordings, viewing preference information, etc.

Figure 2:
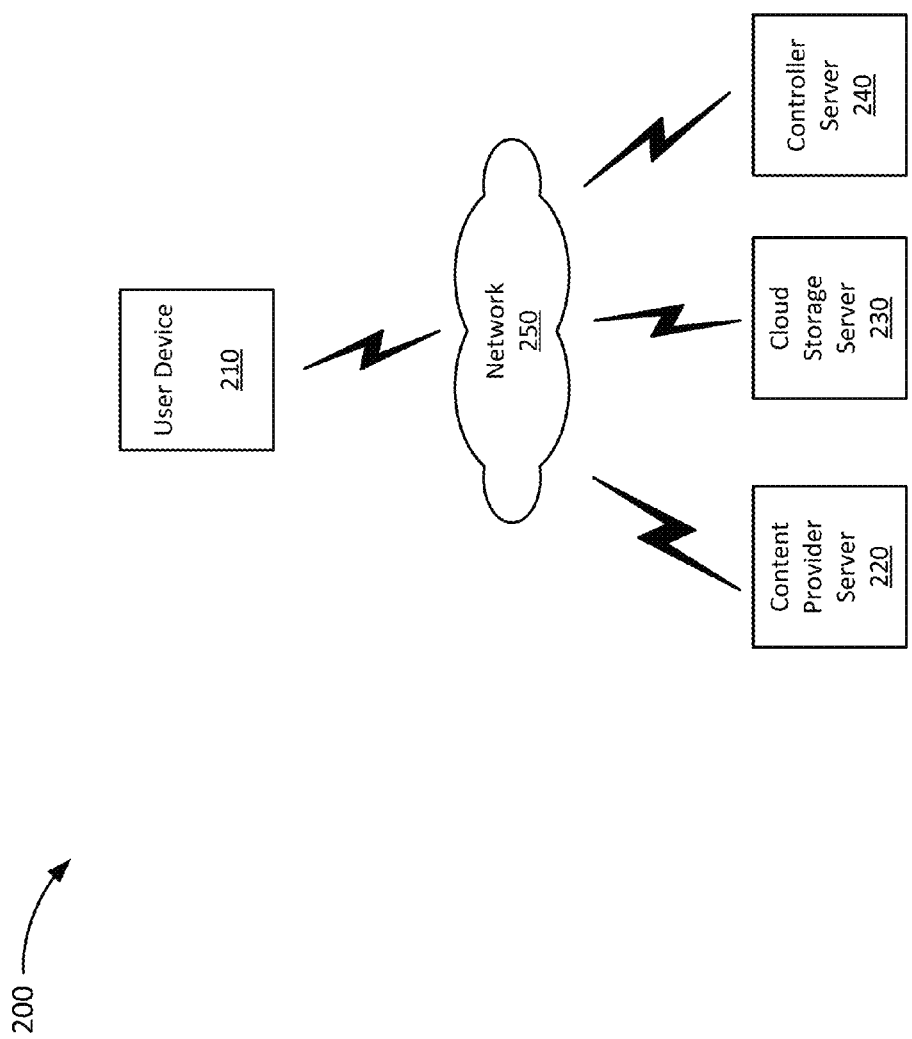
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, content provider server 220, cloud storage server 230, controller server 240, and network 250.

User device 210 may include a device capable of communicating via a network, such as network 250. For example, user device 210 may correspond to a set-top box, and/or some other type of device that may receive content and provide an instruction to record content to be later accessed. For example, user device 210 may include a mobile communication device (e.g., a smart phone), a portable computer device (e.g., a laptop or a tablet computer), a gaming device, a desktop computing device, and/or some other type of computing device. In some implementations, user device 210 may provide a recording instruction to content provider server 220 to direct content provider server 220 to provide content for storage on cloud storage server 230 where the content may be later accessed. Cloud storage server 230 may provide the content to user device 210 when the content is requested. Additionally, or alternatively, cloud storage server 230 may provide the content for storage on user device 210 at an off-peak time and/or when a user is likely to request the content.

Content provider server 220 may include one or more computing devices, such as a server device or a collection of server devices. In some implementations, content provider server 220 may provide content to user device 210. For example, content provider server 220 may provide content, corresponding to live broadcasts associated with broadcast channels, to user device 210. Additionally, or alternatively, content provider server 220 may provide other content, not associated with broadcast channels, to user device 210 (e.g., subscription-based content, on-demand content, or the like). In some implementations, content provider server 220 may receive a recording instruction from user device 210 and may provide content to cloud storage server 230 for storage on behalf of user device 210.

Cloud storage server 230 may include one or more computing devices, such as a server device or a collection of server devices. In some implementations, cloud storage server 230 may receive content for storage on behalf of user device 210. In some implementations, cloud storage server 230 may receive a content offload instruction from controller server 240, and may provide the content for storage on user device 210 when one or more criteria, included in the content offload instruction, is met. Cloud storage server 230 may then remove the content from a storage device, or set of storage devices, associated with cloud storage server 230, after providing the content to user device 210. Cloud storage server 230 may also function as an application server to manage recordings on behalf of a user, receive user viewing preference information, manage user account information, etc.

Controller server 240 may include one or more computing devices, such as a server device or a collection of server devices. In some implementations, controller server 240 may identify that a unique copy of content, stored by cloud storage server 230, should be offloaded from cloud storage server 230 to user device 210 (e.g., provided to user device 210 and subsequently removed from cloud storage server 230). For example, controller server 240 may identify content that should be offloaded based on attributes of the content (e.g., the name of the content, a genre of the content, a popularity measurement of the content, etc.), and/or attributes of a particular user (e.g., a user's viewing history or viewing preference of the content).

In some implementations, viewing history information may be received based on a user opting in to a service whereby viewing history information, regarding the user, is collected. In some such implementations, the user may have the option of opting out of this service at any time. Furthermore, the user may have the option to access and/or delete the viewing history information that pertains to the user.

Network 250 may include one or more wired and/or wireless networks. For example, network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wide area network (WAN), a metropolitan network (MAN), the Public Switched Telephone Network (PSTN), an ad hoc network, a managed Internet Protocol (IP network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
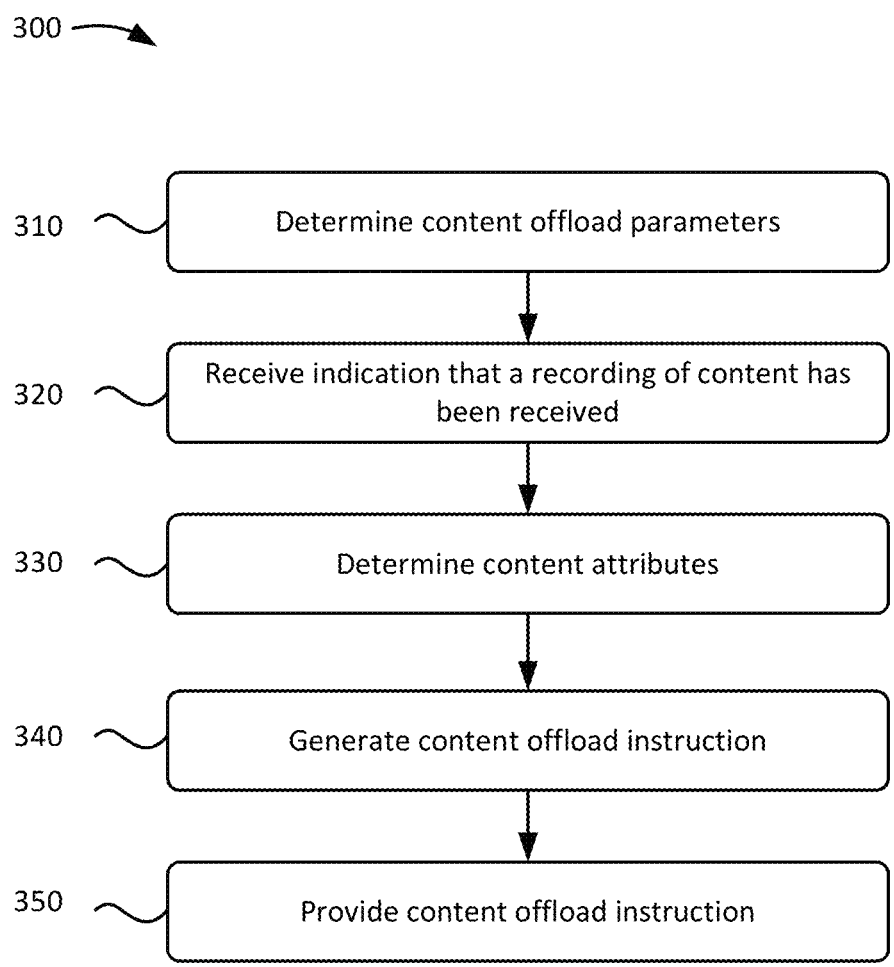
FIG. 3 illustrates a flowchart of an example process for generating and providing a content offload instruction.

FIG. 3 illustrates a flowchart of an example process 300 for generating and providing a content offload instruction. In one implementation, process 300 may be performed by one or more components of controller server 240. In another implementation, some or all of blocks of process 300 may be performed by one or more components of another device in environment 200 (e.g., user device 210, content provider server 220, and/or cloud storage server 230), or a group of devices including or excluding controller server 240.

As shown in FIG. 3, process 300 may include determining content offload parameters (block 310). For example, controller server 240 may determine the content offload parameters. In some implementations, the content offload parameters may be used to identify content, having particular attributes, that should be offloaded to user device 210. As an example, controller server 240 may determine that content having a particular name, or content of a particular genre, should be offloaded within one week of the content having been recorded and stored by cloud storage server 230. In some implementations, controller server 240 may determine different sets of content offload parameters for respective different user accounts.

In some implementations, a user's viewing history and/or the ratings provided by the user (e.g., as identified in a user account or user profile of the user) may be used to determine the content offload parameters. Additionally, or alternatively, popularity measurements, and/or some other information may be used to determine the content offload parameters. In some implementations, controller server 240 may receive a user's content viewing history associated with particular content, popularity information associated with the particular content, the user's rating information of the particular content, and/or some other information regarding the content in order to determine the content offload parameters.

In some implementations, controller server 240 may monitor and store information relating to the user's viewing history. In some implementations, the user's viewing history may correspond to channels that the user has historically selected to view, television shows and/or movies the user has historically selected to view, genres of television shows and/or movies the user has historically selected to view, etc. Additionally, or alternatively, the user's viewing history may correspond to television shows and/or movies that the user has historically selected to record, and/or to access in some other way.

In some implementations, controller server 240 may store a user profile that identifies the user's content preferences. For example, a user may access the user profile to provide content preferences (e.g., the user's favorite television shows and/or genres of content, user ratings associated with content, etc.).

In some implementations, controller server 240 may determine a measure of content popularity based on content ratings and user ratings from multiple users. For example, controller server 240 may determine the measure of popularity based on a ratings system (e.g., Neilsen ratings, another system that identifies a number of households that view particular content, and/or some other measure of popularity). Additionally, or alternatively, controller server 240 may determine the measure of popularity based on critic reviews of the content. Additionally, or alternatively, controller server 240 may determine the measure of popularity using some other technique.

As an example, assume that the user's viewing history indicates that the user accesses content having a particular attribute (e.g., content named "Content A") one week after "Content A" has been recorded, or one week after an original broadcast date of "Content A." Given this assumption, controller server 240 may determine that "Content A" should be offloaded one week after "Content A" has been recorded, or one week after an original broadcast date of "Content A."

As another example, assume that another item of content (e.g., content named "Content B") has a particular popularity measurement (e.g., a popularity measurement of 10 on a scale of 1 to 10). Further, assume that content having a popularity measurement of 10 is historically viewed by the user within two hours after the content has been recorded. Given these assumptions, controller server 240 may determine that "Content B" should be offloaded within two hours of being recorded.

As another example, assume that content of a particular genre (e.g., a "live sports" genre) is viewed by the user within thirty minutes of having been recorded. Given this assumption, controller server 240 may determine that content of the "live sports" genre should be offloaded within thirty minutes of being recorded. In some implementations, the content offload parameters may identify that content should be offloaded during a specified time period (e.g., a time period that is associated with an "off-peak" time period), and/or at some other time.

In some implementations, controller server 240 may determine content offload parameters based on multiple attributes associated with content. For example, controller server 240 may determine content offload parameters for content having a first attribute (e.g., a particular genre, such as a "comedy television show" genre) and a second attribute (e.g., a popularity score of 8 out of 10). The content offload parameters for the content may be based on user viewing history of content having the multiple attributes. Additionally, or alternatively, the content offload parameters may be based on the user's rating information of the content having the multiple parameters. Additionally, or alternatively, the content offload parameters may be based on some other information relating to the content having the multiple parameters.

In some implementations, the content offload parameters may be based on user input. For example, a user of user device 210 may provide, to controller server 240, information that specifies that content, having a particular set of attributes, should be offloaded when particular criteria are met. In some implementations, controller server 240 may store the content offload parameters in a data structure. In some implementations, content offload parameters may be different for different users of user device 210. That is, controller server 240 may determine different content offload parameters for different users of different user devices 210. Additional examples of content offload parameters, the storage of the content offload parameters in a data structure, are described below with respect to FIG. 4.

Process 300 may also include receiving an indication that a recording of content has been received (block 320). For example, controller server 240 may receive the indication when user device 210 provides a recording instruction to content provider server 220. In some implementations, controller server 240 may receive the indication from user device 210 and/or from content provider server 220. In some implementations, the indication may identify an account or user associated with user device 210. Additionally, or alternatively, the indication may include an identifier of the content associated with the recording instruction.

Process 300 may further include determining the content attributes (block 330). For example, controller server 240 may determine the attributes of the recorded content based on an identifier of the content, and/or based on information stored by an information repository that stores content information. In some implementations, controller server 240 may identify attributes, such as a name of the content, a genre of the content, a type of the content (e.g., a "live broadcasted content" type, a "new" or "repeat episode" type, etc.), a popularity score of the content, user ratings of the content, user viewing history of the content, etc.

Process 300 may also include generating a content offload instruction (block 340). For example, controller server 240 may generate the content offload instruction based on the content attributes, and the content offload parameters associated with the user. As a general example, assume that the content is associated with a set of attributes, and that the content offload parameters (determined at block 310) identify that any content having one or more of the attributes in the set of attributes should be offloaded when particular criteria are met (e.g., at an off-peak time, when the content is first requested by the user of user device 210, after a particular time that the content was recorded and stored by cloud storage server 230, and/or some other criteria). Given these assumptions, controller server 240 may generate a content offload instruction that directs cloud storage server 230 to provide a unique copy of the content to user device 210, and subsequently remove the unique copy of the content from cloud storage server 230, when the particular criteria are met.

As an example, assume that the content attributes include a content name (e.g., "Content A"), a content type (e.g., a "new episode" type), and a popularity score of 9 out of 10. Further, assume that the content offloading parameters identify that any content having any content name, a "new episode" type, and a popularity score of 9 or more should be offloaded at an off-peak time within one day of the content being recorded and stored by cloud storage server 230. Given this assumption, controller server 240 may generate a content offload instruction that indicates that the unique copy of the content is be offloaded at an off-peak time within one day of the content being recorded and stored by cloud storage server 230.

Process 300 may further include providing the content offload instruction (block 350). For example, controller server 240 may provide the content offload instruction to cloud storage server 230. As described above, cloud storage server 230 may receive the content offload instruction, identify that the criteria in the content offload instruction have been met, provide the unique copy of the content for storage on user device 210, and remove the unique copy of the content from cloud storage server 230. As a result, the unique copy of the content may be temporarily stored by cloud storage server 230 for the user until the unique copy of the content should be offloaded (e.g., at an off-peak time, a time corresponding to when the user is likely to view the content, and/or at some other time). Alternatively, controller server 240 may not provide the content offload instruction, and may identify that the criteria in the content offload instruction have been met. Based on identifying that criteria have been met, controller server 240 may provide an instruction to direct cloud storage server 230 to provide the unique copy of the content to user device 210, and remove the unique copy of the content from cloud storage server 230.

Further, the user may request the content from cloud storage server 230 even before the content has been offloaded to user device 210. In some implementations, cloud storage server 230 may provide the content for storage on user device 210 based on receiving a request for the content from user device 210. Cloud storage server 230 may subsequently remove the content based on providing the content to user device 210 (e.g., when the content is provided as part of a content offload instruction or when the content is provided in response to a request for the content).

FIG. 4 illustrates an example data structure 400 that may store content offload parameters. A particular instance of data structure 400 may contain content offload parameters for one or more users of a particular group of user devices 210. Another instance of data structure 400 may contain different offload parameters for different users of a different group of user devices 210. One instance of data structure 400 may contain different information and/or fields than another instance of data structure 400. In some implementations, data structure 400 may be stored in a memory of controller server 240. In some implementations, data structure 400 may be stored in a memory separate from, but accessible by, controller server 240 (e.g., a "cloud" storage device). In some implementations, data structure 400 may be stored by some other device in environment 200, such as user device 210, content provider server 220, and/or cloud storage server 230.

As shown in FIG. 4, data structure 400 may store content attributes and corresponding offload criteria. The offload criteria may identify criteria that, if met, should cause cloud storage server 230 to offload content having a corresponding set of content attributes. In an example shown in FIG. 4, data structure 400 may store information identifying that content having a particular attribute (e.g., the content name "Show 1") should be offloaded one week after the content has been recorded and at an off-peak time. As described above, the content offload parameters may be based on a user's viewing history of content having a particular set of one or more attributes. For example, data structure 400 may store information identifying that content having a particular attribute (e.g., the content name "Show 1") should be offloaded one week after the content has been recorded when the user's viewing history indicates that the content having the particular attribute has been historically requested one week after the content has been recorded.

In a similar manner, data structure 400 may store information identifying that any content having a set of multiple attributes (e.g., a "Television show" content type, a "Drama" content genre, and a popularity measurement of 8 out of 10) should be offloaded at the first off-peak time after the content has been recorded. For example, data structure 400 may store the information identifying that any content having the set of multiple attributes should be offloaded at the first off-peak time after the content has been recorded when the user's viewing history indicates that the content having the set of multiple attributes has been historically requested within a particular amount of time after the content has been recorded.

In some implementations, information stored by data structure 400 may be based on user input. For example, a user may select the offload criteria for a given set of content attributes. As shown in FIG. 4, the offload criteria may identify that content should be offloaded at a particular time of day, a particular time period after content has been recorded, when content is first requested after being recorded, and/or at some other time. Additionally, or alternatively, the offload criteria may identify that the content should be offloaded when some other criteria are satisfied (e.g., when storage availability of user device 210 reaches a particular threshold, when storage availability for the user on cloud storage server 230 falls below a particular threshold, etc.).

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
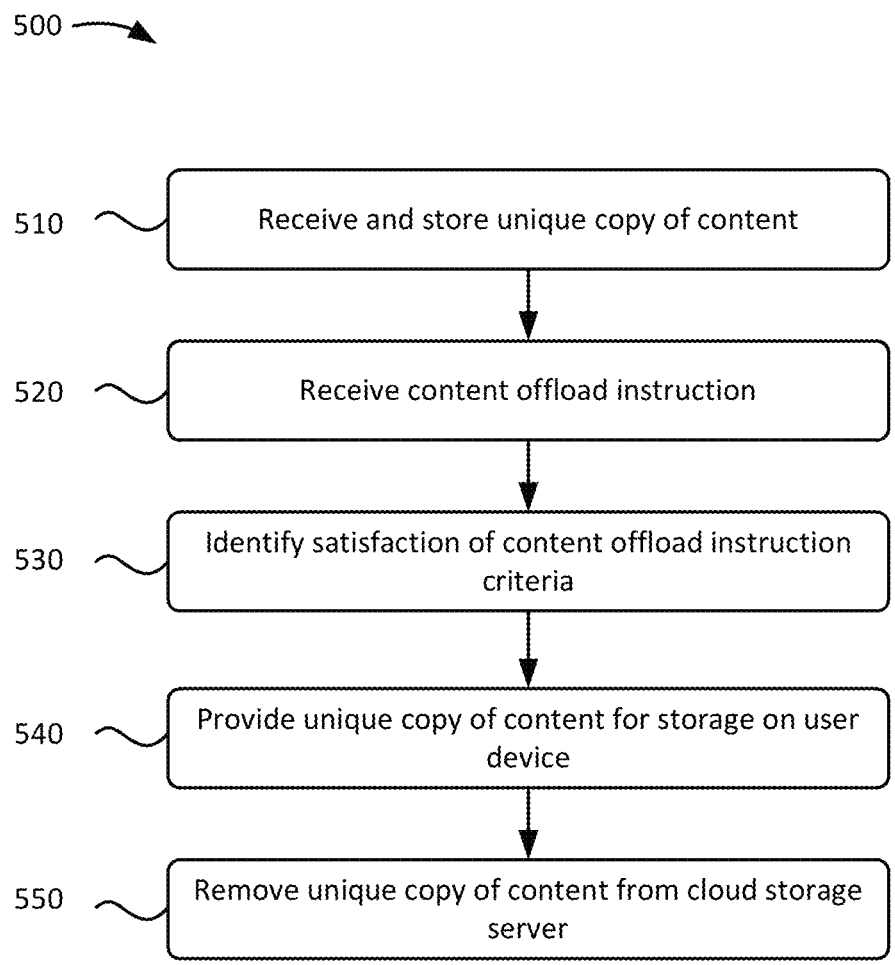
FIG. 5 illustrates a flowchart of an example process for executing a content offload instruction.

FIG. 5 illustrates a flowchart of an example process 500 for executing a content offload instruction. In some implementations, process 500 may be performed by one or more components of cloud storage server 230. In some implementations, some or all of blocks of process 500 may be performed by one or more components of another device in environment 200 (e.g., user device 210, content provider server 220, and/or controller server 240), or a group of devices including or excluding cloud storage server 230.

As shown in FIG. 5, process 500 may include receiving and storing a unique copy of content (block 510). For example, cloud storage server 230 may receive the unique copy of the content from content provider server 220. In some implementations, cloud storage server 230 may receive the unique copy of the content when content provider server 220 receives a recording instruction from a user via user device 210. In some implementations, cloud storage server 230 may store the unique copy of the content and may store information that associates the unique copy of the content with the user.

Process 500 may further include receiving a content offload instruction (block 520). For example, cloud storage server 230 may receive the content offload instruction from controller server 240. In some implementations, cloud storage server 230 may receive the content offload instruction when controller server 240 generates the content offload instruction as described above. In some implementations, the content offload instruction may identify that the unique copy of the content, associated with the user, should be offloaded when particular criteria are met. The content offload instruction may identify a particular user device 210 with which the unique copy of the content should be provided.

Process 500 may also include identifying the satisfaction of the content offload instruction criteria (block 530). For example, cloud storage server 230 may identify the satisfaction of the criteria included in the content offload instruction. As an example, assume that the content offload instruction identifies that the unique copy of the content should be provided to user device 210 at an off-peak time and after one week from when the content was stored by cloud storage server 230. At an off-peak time after one week from when the unique copy of the content was stored by cloud storage server 230, cloud storage server 230 may then identify the satisfaction of the criteria. Additionally, or alternatively, controller server 240 may identify the satisfaction of the content offload criteria, and may provide an instruction to cloud storage server 230 to provide the unique copy of the content to user device 210 based on identifying the satisfaction of the content offload criteria.

Process 500 may further include providing the unique copy of the content for storage on the user device (block 540). For example, cloud storage server 230 may provide the unique copy of the content to the particular user device 210 identified in the content offload instruction based on identifying the satisfaction of the criteria or based on receiving the instruction (e.g., from controller server 240) to provide the unique copy of the content. Additionally, or alternatively, cloud storage server 230 may provide the unique copy of the content based on receiving a request from user device 210 for the content (e.g., when a user of user device 210 selects to receive the content at a desired time). Based on receiving the content, user device 210 may store the unique copy of the content such that the content may be presented without the need to access cloud storage server 230.

Process 500 may also include removing the unique copy of the content from the cloud storage server (block 550). For example, cloud storage server 230 may remove the unique copy of the content once the unique copy of the content has been provided for storage on user device 210. As a result, storage on cloud storage server 230 may be made available to temporarily store other content on behalf of user device 210 until a user of user device 210 is likely to view the content, when storage for content is available on user device 210, and/or when some other criteria are met.

Figure 6:
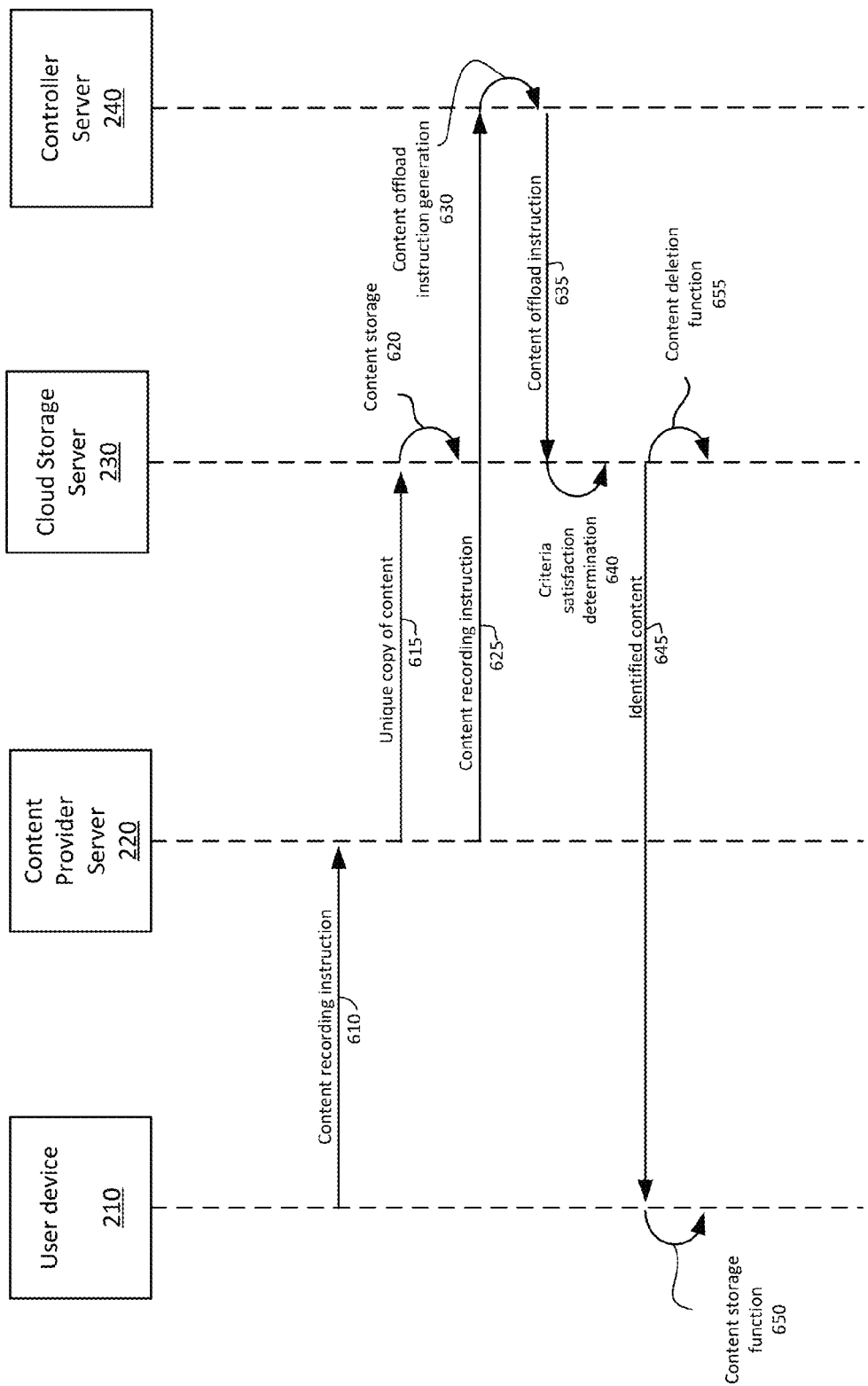
FIG. 6 illustrates a signal flow diagram of example operations for offloading content from a cloud storage server to a user device.

FIG. 6 illustrates a signal flow diagram of example operations for offloading content from a cloud storage server to a user device. In FIG. 6, assume that controller server 240 has determined content offloading parameters based on user viewing history information, user viewing preference information, and/or some other information as described above with respect to process 300 in FIG. 3.

As shown in FIG. 6, user device 210 may provide a content recording instruction to content provider server 220 (at 610). For example, user device 210 may provide the content recording instruction in response to receiving an instruction (e.g., via a user interface of user device 210) to record content provided by content provider server 220 (e.g., live broadcasted content associated with a broadcast channel, and/or some other content). In some implementations, the content recording instruction may include information identifying a user account, and particular content that content provider server 220 should provide to cloud storage server 230 for storage on behalf of a user associated with the user account.

Based on receiving the content recording instruction, content provider server 220 may provide a unique copy of the content to cloud storage server 230 (at 615). For example, content provider server 220 may provide a unique copy of the content identified in the content recording instruction. Additionally (e.g., when providing the unique copy of the content), content provider server 220 may provide information identifying the user account with which cloud storage server 230 is to associate the unique copy of the content. Based on receiving the unique copy of the content, cloud storage server 230 may store (at 620) the unique copy of the content, and may associate the unique copy of the content with the user account.

Content provider server 220 may also forward the content recording instruction to controller server 240 (at 625). Alternatively, controller server 240 may receive the content recording instruction from user device 210, cloud storage server 230, or from another source. Based on receiving content recording instruction 610, controller server 240 may generate content offloading instructions (at 630) for the particular content identified in content recording instruction 610. For example, controller server 240 may identify attributes of the content, and identify criteria under which the unique copy of the content should be offloaded (e.g., based on information stored by data structure 400 and as described above with respect to process 300 in FIG. 3). In some implementations, controller server 240 may provide the content offloading instruction (at 635) to cloud storage server 230, as described above. Additionally, or alternatively, controller server 240 may store the content offloading instruction without providing the content offloading instruction.

As further shown in FIG. 6, cloud storage server 230 may determine that criteria, included in the content offloading instructions, have been satisfied (at 640). For example, the criteria may include a particular time period after content has been recorded, a particular time of day, etc. Based on determining that the criteria have been satisfied, cloud storage server 230 may provide identified content (e.g., a unique copy of the content meeting the criteria) to user device 210. User device 210 may store the identified content (at 650), and cloud storage server 230 may remove the identified content (at 655) after providing the identified content to user device 210.

In some implementations, controller server 240 may determine that the criteria have been satisfied. If controller server 240 determines that the criteria have been satisfied, controller server 240 may provide a content removal instruction to direct cloud storage server 230 to provide the unique copy of the content to user device 210. Cloud storage server may then provide the identified content to user device 210 and delete the identified content after providing the identified content.

Figure 7:
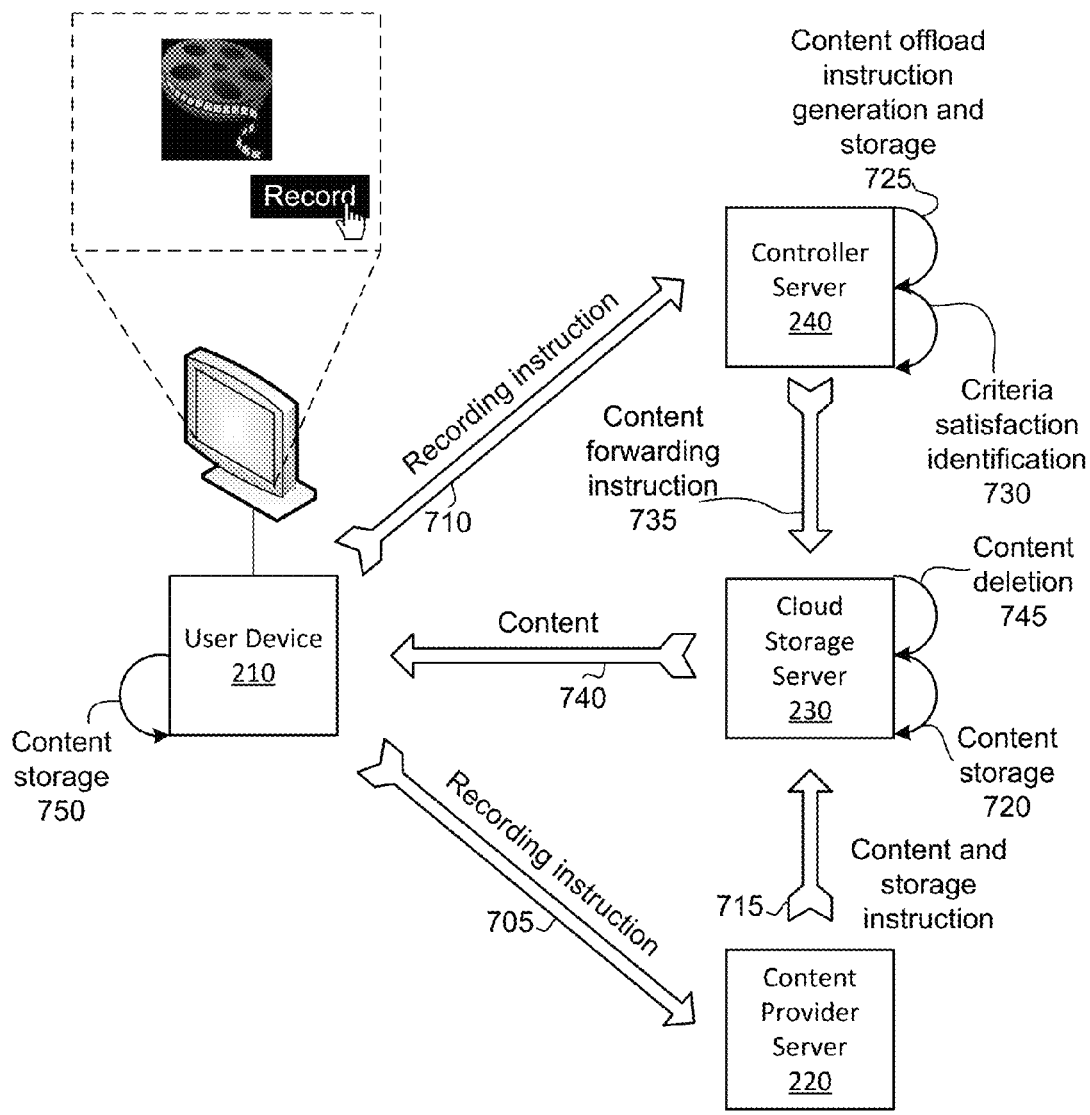
FIG. 7 illustrates an example implementation for temporarily storing content on a cloud storage server and offloading the content from the cloud storage server to a user device.

FIG. 7 illustrates an example implementation for temporarily storing content on a cloud storage server and offloading the content from the cloud storage server to a user device. As shown in FIG. 7, user device 210 may receive a selection from a user to record particular content (e.g., live broadcast content provided to user device 210 from content provider server 220). Based on receiving the selection, user device 210 may provide a recording instruction (arrow 705) to content provider server 220. User device 210 may also provide the recording instruction to controller server 240 (arrow 710). Additionally, or alternatively, content provider server 220 may provide the recording instruction to controller server 240 (e.g., in lieu of user device 210 providing the recording instruction to controller server 240). The recording instruction may identify user device 210 and/or a user account. Based on receiving the recording instruction, content provider server 220 may provide, to cloud storage server 230, a unique copy of the particular content and an instruction to store the content on behalf of user device 210 associated with the user account (arrow 715). Cloud storage server 230 may store the unique copy of the particular content, and may associate the unique copy of the particular content with the user account and user device 210 (arrow 720).

Based on receiving the recording instruction, controller server 240 may identify attributes of the particular content, and content offload parameters associated with the user account identified in the recording instruction. Controller server 240 may then generate and store content offload instructions based on the attributes and the content offload parameters (arrow 725). As described above, the content offload instructions may identify that the unique copy of the particular content should be offloaded from cloud storage server 230 to user device 210 when particular criteria are satisfied (e.g., when the user is likely to access the content, when storage is available on user device 210, when the user's usage of allocated storage on cloud storage server 230 has been exceeded, at an off-peak time, etc.). Controller server 240 may identify that the particular criteria have been satisfied (arrow 730), and may provide a content forwarding instruction to cloud storage server 230 (arrow 735). The content forwarding instruction may direct cloud storage server 230 to provide the unique copy of the particular content to user device 210, and to subsequently remove the content from cloud storage server 230. Cloud storage server 230 may provide the unique copy of the particular content to user device 210 (arrow 740) and delete the content after providing the content (arrow 745).

User device 210 may store the unique copy of the content (arrow 750), such that the content can be accessed directly from user device 210 without the need to access cloud storage server 230, thereby reducing network load when accessing cloud storage server 230. Further, cloud storage server 230 may temporarily store the unique copy of the content for user device 210 until particular criteria have been satisfied, such as until storage is available on user device 210, the user's usage of allocated storage space on cloud storage server 230 has been exceeded, the user is likely to access the content (e.g., as determined based on the user's viewing history, viewing preferences, content popularity, etc.), or until some other criteria have been satisfied. Further, cloud storage server 230 may function as an application server to provide the user with a technique to manage the user's recordings, viewing preference information, etc.

While one example is shown in FIG. 7, the above description is merely an example implementation. In practice, other examples are possible from what is described above in FIG. 7.

FIG. 8 is a diagram of example components of device 800. One or more of the devices described above (e.g., with respect to FIGS. 1, 2, 6, and 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signal flows have been described with regard to FIGS. 3, 5, and 6, the order of the blocks and/or signal flows may be modified in other implementations. Further, non-dependent blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2A, 2B, and 3), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
    receiving, by a server device and from a user device, a request to store particular content;
    storing, by the server device in a storage device associated with the server device, a unique copy of the particular content,
        the unique copy being associated with a particular user;
    determining, by the server device, a set of attributes of the particular content;
    determining, by the server device, a set of criteria based on which the unique copy of the particular content should be provided to the user device, the criteria being based on at least one of:
        whether a particular amount of time has passed since the unique copy of the particular content has been stored by the storage device,
        whether the user device has storage space to store the unique copy of the particular content, or
        whether an amount of storage space utilization, allocated to the user device, on the storage device exceeds a threshold amount of storage space utilization;
    determining, by the server device and based on one or more attributes, of the set of attributes of the particular content, that the set of criteria have been met;
    outputting, by the server device and based on determining that the set of criteria have been met, the unique copy of the particular content to the user device; and
    deleting, by the server device, the unique copy of the particular content from the storage device after outputting the particular content to the user device.

2. The method of claim 1, wherein the set of criteria further include:
    a particular time of day at which the unique copy of the particular content should be outputted to the user device.

3. The method of claim 1, wherein the attributes include at least one of:
    a name or identifier of the particular content,
    a measure of popularity of the particular content,
    a type of the particular content,
    a description of the particular content, or
    a genre of the particular content.

4. The method of claim 3, further comprising:
    receiving or identifying the user viewing history information or the user preference information from a user of the user device or from a user account associated with the user,
    wherein determining the set of criteria is based on receiving or identifying the user viewing history information or the user preference information.

5. The method of claim 1, further comprising:
    determining the set of criteria further based on at least one of:
        user viewing history information,
        user preference information, or
        a measure of popularity of the particular content.

6. The method of claim 1, further comprising:
    receiving an indication of a recording of the particular content,
    wherein determining the set of attributes of the particular content is based on receiving the indication of the recording of the particular content.

7. The method of claim 1, wherein the particular content is associated with live broadcasted content.

8. The method of claim 1, wherein the request to store the particular content corresponds to a request to record the particular content,
    the particular content being provided by a content provider.

9. A system comprising:
    a server device, comprising:
        a non-transitory memory device storing:
            a plurality of processor-executable instructions, and
            a unique copy of particular content, the unique copy of the particular content being stored based on a request from a user device, the unique copy being associated with a particular user; and a processor configured to execute the processor-executable instructions, wherein executing the processor-executable instructions causes the processor to:
  determine a set of attributes of the particular content;
  determine a set of criteria based on which the unique copy of the particular content should be provided to the user device, the set of criteria including at least one of:
    whether a particular amount of time has passed since the unique copy of the particular content has been stored by the memory device,
    whether the user device has available storage space to store the unique copy of the particular content, or
    whether an amount of storage space utilization, allocated to the user device, on the memory device exceeds a threshold amount of storage space utilization;
  determine that the set of criteria have been met;
  output, based on determining that the set of criteria have been met, the unique copy of the particular content to the user device; and
  delete the unique copy of the particular content from the memory device after outputting the particular content to the user device.

10. The system of claim 9, wherein the set of criteria further include:
  a particular time of day at which the unique copy of the particular content should be outputted to the user device.

11. The system of claim 9, wherein the attributes include at least of:
  a name or identifier of the particular content,
  a measure of popularity of the particular content,
  a type of the particular content,
  a description of the particular content, or
  a genre of the particular content.

12. The system of claim 9, wherein executing the processor-executable instructions further causes the processor to:
  determine the set of criteria further based on at least one of:
    user viewing history information,
    user preference information, or
    a measure of popularity of the particular content.

13. The system of claim 12, wherein executing the processor-executable instructions further causes the processor to:
  receive or identify the user viewing history information or the user preference information from a user of the user device or from a user account associated with the user,
  wherein executing the processor-executable instructions, to determine the set of criteria, causes the processor to determine the set of criteria based on receiving or identifying the user viewing history information or the user preference information.

14. The system of claim 9, wherein the executing the processor-executable instructions further causes the processor to:
  receive an indication of a recording of the content,
  wherein when determining the set of attributes of the particular content, the server device is to determine the set of attributes of the particular content based on receiving the indication of the recording of the particular content.

15. The system of claim 9, wherein the particular content is associated with live broadcasted content.

16. The system of claim 9, wherein the request to store the particular content corresponds to a request to record the particular content,
  the particular content being provided by a content provider.

17. A non-transitory computer-readable medium storing processor-executable instructions, which, when executed by a processor of a server device, cause the processor to:
  receive a particular set of criteria under which a unique copy of content, stored by the server device, should be provided from the server device to a user device,
  the unique copy being associated with a particular user,
  the particular set of criteria being associated with a set of attributes of the content, the set of attributes being based on at least one of:
    whether a particular amount of time has passed since the unique copy of the particular content has been stored by the storage device,
    whether the user device has storage space to store the unique copy of the particular content, or
    whether an amount of storage space utilization, allocated to the user device, on the storage device exceeds a threshold amount of storage space utilization;
  identify that one or more criteria, in the set of criteria, have been satisfied; and
  offload the unique copy of the content from the server device to the user device based on identifying that the one or more criteria have been satisfied, wherein the processor-executable instructions, to offload the unique copy of the content, include processor-executable instructions to:
    remove the unique copy of the content from the server device after providing the content to the user device.

18. The non-transitory computer-readable medium of claim 17, wherein the criteria further include:
  a particular time of day at which the unique copy of the particular content should be offloaded to the user device.

19. The non-transitory computer-readable medium of claim 17, wherein the content is related to live broadcast content associated with a broadcast channel.

20. The non-transitory computer-readable medium of claim 17, wherein the server device is a first server device, wherein the processor-executable further include processor-executable instructions to:
  receive the unique copy of the content from a second server device, the second server device providing the unique copy of the content in response to receiving a request to record the content and provide the unique copy of the content to the first server device,
  wherein the particular set of criteria is received by the first server device after the unique copy of the content is received from the second server device.

* * * * *